(12) United States Patent
Tremaine et al.

(10) Patent No.: US 8,595,463 B2
(45) Date of Patent: Nov. 26, 2013

(54) MEMORY ARCHITECTURE WITH POLICY BASED DATA STORAGE

(75) Inventors: Robert B. Tremaine, Stormville, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/882,551

(22) Filed: Sep. 15, 2010

(65) Prior Publication Data

US 2012/0066473 A1    Mar. 15, 2012

(51) Int. Cl.
*G06F 12/00*    (2006.01)
(52) U.S. Cl.
USPC .......................................... 711/203; 711/103
(58) Field of Classification Search
USPC .................................. 711/203, 103
See application file for complete search history.

(56) References Cited

U.S. PATENT DOCUMENTS

| | | | |
|---|---|---|---|
| 5,758,182 A * | 5/1998 | Rosenthal et al. ................. 710/3 |
| 6,532,538 B1 | 3/2003 | Cronk et al. |
| 7,146,499 B2 | 12/2006 | Yellepeddy |
| 7,287,140 B1 | 10/2007 | Asanovic et al. |
| 7,424,584 B2 | 9/2008 | Mathews et al. |
| 7,496,711 B2 | 2/2009 | Bartley et al. |
| 7,539,842 B2 | 5/2009 | Tremaine |
| 7,584,336 B2 | 9/2009 | Tremaine |
| 2006/0095690 A1 | 5/2006 | Craddock et al. |
| 2006/0236127 A1 | 10/2006 | Kurien et al. |
| 2006/0282645 A1 * | 12/2006 | Tsien ............................ 711/207 |
| 2008/0109593 A1 * | 5/2008 | Karamcheti et al. .......... 711/103 |
| 2008/0280559 A1 | 11/2008 | Dandekar et al. |
| 2011/0202705 A1 * | 8/2011 | Hayashi et al. .................... 711/6 |

OTHER PUBLICATIONS

Leendert Van Doorn; "Hardware Virtualization Trends"; Jun. 14, 2006; pp. 1-44, IBM Corporation, T.J. Watson Research Center.
"Logical Partition Security in the IBM eserver pSeries 690" 1st Ed., Feb. 14, 2002; 13 pages, , IBM Corporation.

* cited by examiner

*Primary Examiner* — Hashem Farrokh
(74) *Attorney, Agent, or Firm* — Matthew C. Zehrer

(57) ABSTRACT

A computing system and methods for memory management are presented. A memory or an I/O controller receives a write request where the data two be written is associated with an address. Hint information may be associated with the address and may relate to memory characteristics such as an historical, O/S direction, data priority, job priority, job importance, job category, memory type, I/O sender ID, latency, power, write cost, or read cost components. The memory controller may interrogate the hint information to determine where (e.g., what memory type or class) to store the associated data. Data is therefore efficiently stored within the system. The hint information may also be used to track post-write information and may be interrogated to determine if a data migration should occur and to which new memory type or class the data should be moved.

20 Claims, 12 Drawing Sheets

MEMORY CHARACTERISTIC TABLE ⎯134

| Mem Unit | Latency | Pwr | Write Cost | Read Cost |
|---|---|---|---|---|
| M44 | slowest | mid | low | low |
| ••• | ••• | ••• | ••• | ••• |
| M31 | slow | low | high | mid |
| ••• | ••• | ••• | ••• | ••• |
| M24 | med slow | low | high | high |
| ••• | ••• | ••• | ••• | ••• |
| M11 | med | high | low | low |
| ••• | ••• | ••• | ••• | ••• |
| M23 | next fast | low | high | high |
| ••• | ••• | ••• | ••• | ••• |
| M12 | fastest | low | high | high |
| ••• | ••• | ••• | ••• | ••• |

FIG. 5A

MEMORY CHARACTERISTIC TABLE 134

| Mem Addr | Pty |
|---|---|
| 9B451 – 9B999 | Highest |
| 8Y295 – 8Y999 | High |
| 1N221 – 1N999 | Med |
| 4K299 – 4K999 | Low |

FIG. 5B

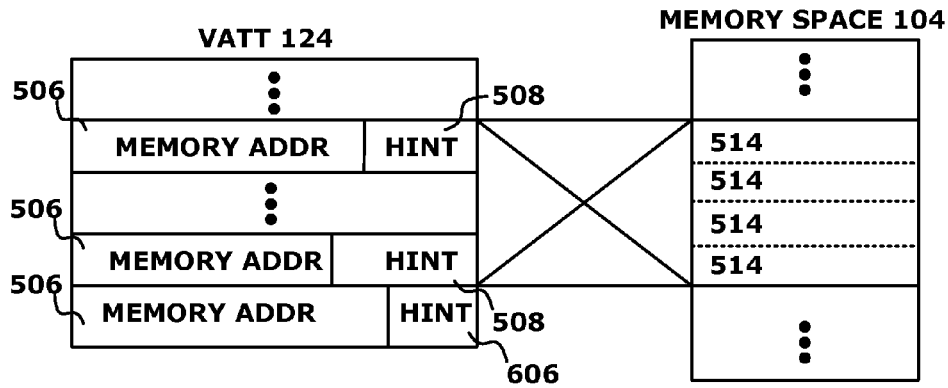

| Addr | Hstry | O/S | Data Prty | Job Prty | Job Impt | Job Catg |
|---|---|---|---|---|---|---|
| 0M740 | No | S | Low | High | Mid | High |
| 0M741 | Rep | S | Low | High | Mid | High |
| 0M742 | Rep | M | Mid | High | Low | Low |
| 0M743 | Rep | M | Mid | Low | High | Low |
| 0M744 | Rep | M | Mid | Low | Low | Low |
| 9K930 | No | M | Mid | Low | Low | Mid |
| 2Y936 | No | F | Mid | High | Low | Mid |
| 3V374 | No | F | Mid | Mid | Low | Mid |
| 0Q388 | No | F | High | Mid | High | Low |
| 7Z475 | No | F | High | High | Low | High |

| Addr | Mem typ |
|---|---|
| 0M740 | M |
| 0M741 | M |
| 3V374 | S |
| 0Q388 | M |
| 7Z475 | F |

| Addr | Mem typ | Usage Freq | Data Age | Data Prty | Job Prty | Job Impt | Job Catg |
|---|---|---|---|---|---|---|---|
| 0M740 | M | Med | Med | Low | Med | High | Low |
| 0M741 | M | Med | Old | High | Low | Low | Low |
| 3V374 | S | Low | Old | Med | Low | Low | Low |
| 0Q388 | M | High | New | Med | Low | High | High |
| 7Z475 | F | High | New | High | Med | Med | High |

FIG. 9

MEMORY ARCHITECTURE WITH POLICY BASED DATA STORAGE

FIELD OF THE INVENTION

Embodiments relate to computer memory management and, more specifically, to organizing data in a memory system having differing memory types or classes of memory.

DESCRIPTION OF THE RELATED ART

Virtually all computer circuits employ some sort of digital memory to store data. Such memory can include a combination of different types of memory devices, including one or more of the following: on-chip memory (such as array of registers), on board memory (such as cache memory), main memory (such as DRAM memory chips on a different circuit board from a processor), flash memory, and disk memory (such as a hard drive).

Some data units (which can include any method of grouping data) residing in a memory space are less-used than other data units stored on the same memory space. However, different parts of a computer's memory space exhibit different memory latencies or the amount of time it takes for data to be transferred from a memory location to the entity that requested it. For example, memory chips closest to a memory buffer are likely to have a lower latency than memory chips farther away from the memory buffer.

Most memory types can be classified in terms of relative speed. For example, on-chip memory is usually faster that on-board memory, and both are usually much faster than disk memory. However, sometimes certain portions of a relatively slower memory type may actually have a lower latency than portions of a relatively faster memory type. Placing frequently used, highly important, etc, data units in a slower portion of the faster memory type instead of the faster portion of the slower memory type may result in a less efficient usage of memory space that may result in greater overall latency, higher total power consumption, etc.

SUMMARY

In certain embodiments a memory or an I/O controller receives a write request where the data to be written is associated with an address. Hint information for determining where; i.e., which type or class of memory to write data, may be associated with the address and may relate to memory characteristics such as an historical, O/S direction, data priority, job priority, job importance, job category, memory type, I/O sender ID, latency, power, write cost, or read cost components. The memory controller may interrogate the hint information to determine where (e.g., what memory type) to store the associated data. Data is therefore efficiently stored within the system in the memory type or class most appropriate based on the hint information. The hint information may also be used to track post-write information and may be interrogated to determine if a data migration should occur and to which new memory type the data should be moved.

In an embodiment a method of memory management includes receiving, by a memory space controller, memory characteristic information imbedded within a virtual address associated with a data store request; and interrogating the memory characteristic information to determine a memory type to which data is to be stored. In certain embodiments the memory space controller may be an input/output controller controlling a memory space that has one or more different memory types.

In another embodiment the method of memory management further includes determining if the virtual address has an excess portion carrying the memory characteristic information; determining the availability of the excess portion to accept additional memory characteristic information; adding additional memory characteristic information to the excess portion; maintaining the memory characteristic information in a table that associates the virtual address to a physical address within the memory type to which data is to be stored; and/or storing the data in the determined memory type. In certain embodiments the table is located in the memory space controller.

In other embodiments the memory characteristic information may include multiple components that are used to categorize the memory space or to categorize data stored in the memory space. Memory characteristic information components may be for example: a historical component, an O/S direction component, a data priority component, a job priority component, a job importance component, a job category component, a requester identification component, a latency component, a power component, a write cost component, and a read cost component.

In an embodiment a method of memory management includes storing data associated with a virtual address to a memory type within a memory space that has one or more memory types; determining whether the virtual address has an excess portion; storing post-write memory characteristic information to the excess portion; determining whether the data should be migrated to a different memory type; determining the availability of the excess portion to accept additional post-write memory characteristic information; adding additional post-write memory characteristic information to the excess portion; and/or maintaining the post-write memory characteristic information in a table that associates the virtual address to a physical address within the memory type where the data is stored.

In another embodiment determining whether the data should be migrated to a different memory type further includes interrogating the post-write memory characteristic information to determine a suggested memory type; and/or comparing the memory type where the data is currently stored with the suggested memory type.

In another embodiment the post-write memory characteristic information includes multiple post-write components that are used to categorize the memory space or to categorize the data in the memory space. The post-write components may be for example: a historical component, an O/S direction component, an access frequency component, a data age component, a data priority component, a job priority component, a job importance component, a job category component, a requester identification component, a latency component, a power component, a write cost component, and a read cost component.

In yet another embodiment a memory system includes a memory space having one or more different memory types; and a memory space controller that stores memory characteristic information imbedded within a virtual address associated with a data store request; and/or a table that associates the virtual address to a physical address within the memory type to which data is to be stored. In certain embodiments the memory space controller determines the memory type within the memory space to which the data should be written by interrogating the imbedded memory characteristic information.

These and other features, aspects, and advantages will become better understood with reference to the following description, appended claims, and accompanying drawings.

BRIEF DESCRIPTION OF THE FIGURES

FIGS. 5A and 5B depict exemplary memory characteristic tables that may be used in creating memory characteristic information, according to various embodiments.

FIG. 6 depicts an exemplary Virtual Address Transition Table (VATT), according to various embodiments.

FIGS. 8A and 8B depicts other exemplary VATTs, according to various embodiments.

FIG. 9 depicts another exemplary VATT, according to various embodiments.

DETAILED DESCRIPTION OF THE EMBODIMENTS

Figure 1:
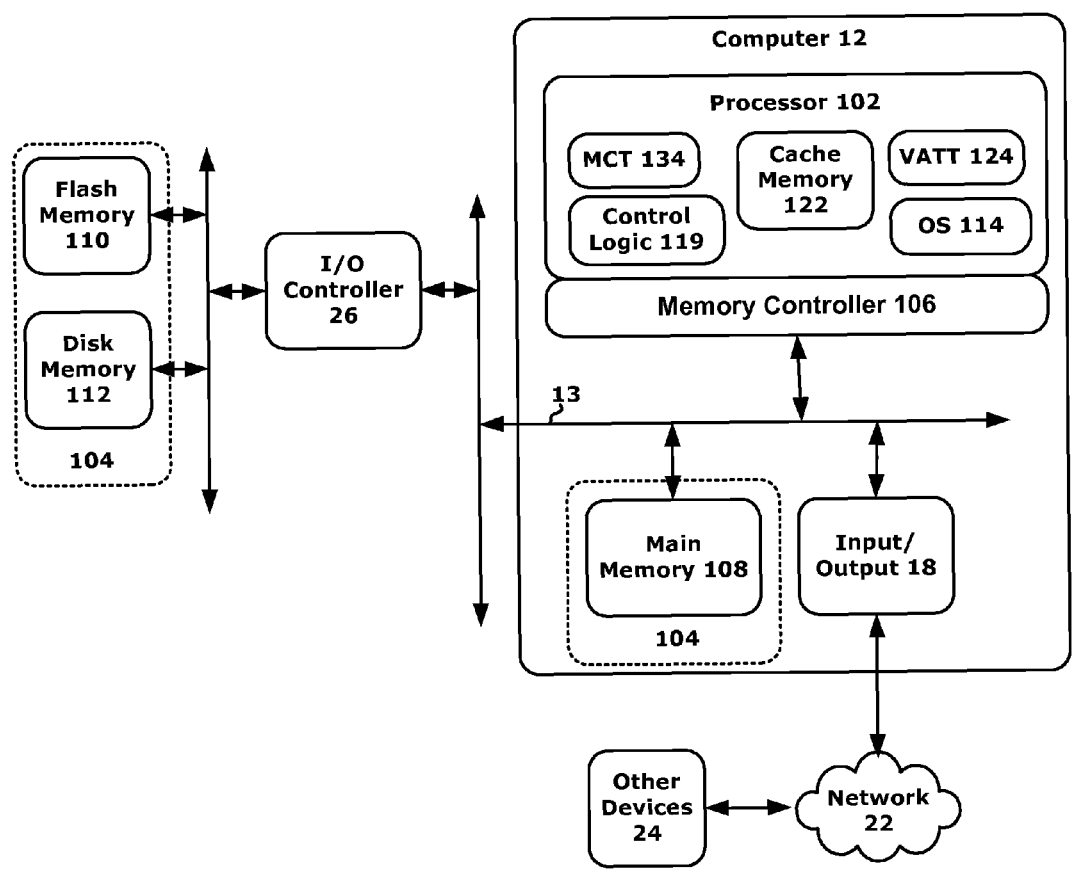
FIG. 1 is a diagram of a computing system having a memory space of multiple memory types, according to various embodiments.

For a better understanding of the various embodiments, together with other and further features and advantages thereof, reference is made to the following description, taken in conjunction with the accompanying drawings and asserted in the claims.

It will be readily understood that components or embodiments, as generally described and illustrated in the FIGs. herein, may be arranged and designed in a wide variety of different configurations. Thus, the following more detailed description of the embodiments of the apparatus, system, and method, as represented in FIGS. 1 through 15, are not intended to limit the scope as claimed, but are merely representative of selected exemplary embodiments.

As will be appreciated by one skilled in the art, various embodiments may be embodied as a system, method, computer program product or any combination thereof. Accordingly, embodiments may take the form of an entirely hardware embodiment, an entirely software embodiment (including firmware, resident software, micro-code, etc) or an embodiment combining software and hardware aspects that may all generally be referred to, for example as a "circuit," "module" or "system." Furthermore, embodiments may take the form of a computer program product embodied in any tangible medium having computer usable program code embodied thereon.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic or other such storage device.

Computer program code for carrying out operations of embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, or as a stand-alone software package.

Appearances of the phrases "in one embodiment" or "in an embodiment" in various places throughout this specification are not necessarily all referring to the same embodiment. In addition, features described in connection with a particular embodiment may be combined or excluded from other embodiments described herein.

Embodiments are described below with reference to flowchart illustrations and/or block diagrams of methods, apparatus, systems, and computer program products according to embodiments. It will be understood that each block of the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In some alternative embodiments, the functions noted in the blocks may occur out of the order noted in the FIGs. For example, two blocks shown in succession may, in fact, be executed substantially concurrently, or the blocks may sometimes be executed in the reverse order. In various embodiments, each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 illustrates an example of a computing system 10 utilizing multiple memory types, according to various embodiments. The system 10 includes a computer 12, a network 22 (e.g., wired or wireless) and other device(s) 24. The network 22 connects the computer 12 to the other device(s) 24 and may include one or more wide area networks (WANs) and/or local area networks (LANs) such as the Internet, intranet(s), and/or wireless communication network(s). In an embodiment, the other device(s) 24 include one or more other computers, storage devices, peripheral devices, etc. Also shown in FIG. 1 are flash memory 110 and disk memory 112 communicating with the computer 12 via a bus 13 (e.g., SCSI, Fibre Channel, etc), as opposed to via the network 22. Input and/or output requests to flash memory 110 and/or disk memory 112 may be managed by one or more I/O controller (s) 26.

Computer 12 includes a processor 102, a main memory ("memory") 108, and input/output component(s) 18, which are in communication via the bus 13. The processor 102 depicted in FIG. 1 includes cache memory ("cache") 122, a software module such as an operating system 114, control logic 119, a virtual address transition table (VATT) 124, and a memory controller 106. In an embodiment, the memory controller 106 includes components such as a VATT 124, an open/free memory listing, and reference counters as described below. In another embodiment, all or portions of the VATT 124, free/open memory listing, and reference counters are stored in main memory 108 and/or in cache memory 122. In an embodiment, the cache memory 122 includes multiple cache levels (e.g., L1, L2, etc) that are on or off-chip from processor 104 (e.g., an L1 cache may be on-chip, an L2 cache may be off-chip, etc). In an embodiment, main memory 108 includes various data stored therein, e.g., instructions, software, routines, etc, which, e.g., may be transferred to/from cache memory 122 by the memory controller 106 for execution by the processor 102.

In an embodiment, there are multiple memory types (e.g., main memory 108, flash memory 110, disk memory 112, etc) that exhibit different characteristics such as, but not limited to: quality of service, latency, bandwidth, utilization power, density, reliability, and other reference costs. The different memory types may be logically grouped and viewed by for example operating system 114 as memory space 104. In an embodiment, pages in one tier of the main memory 108 are stored on flash memory devices and pages in another tier are stored on dynamic random access memory (DRAM) devices. In an embodiment, memory controller 106, I/O controller 26, etc, maps a real memory address to a physical address within the memory type.

In an embodiment, input/output component(s) 108 include one or more components that facilitate local and/or remote input/output operations to/from computer 12, such as a display, keyboard, modem, network adapter, etc (not depicted).

Figure 2:
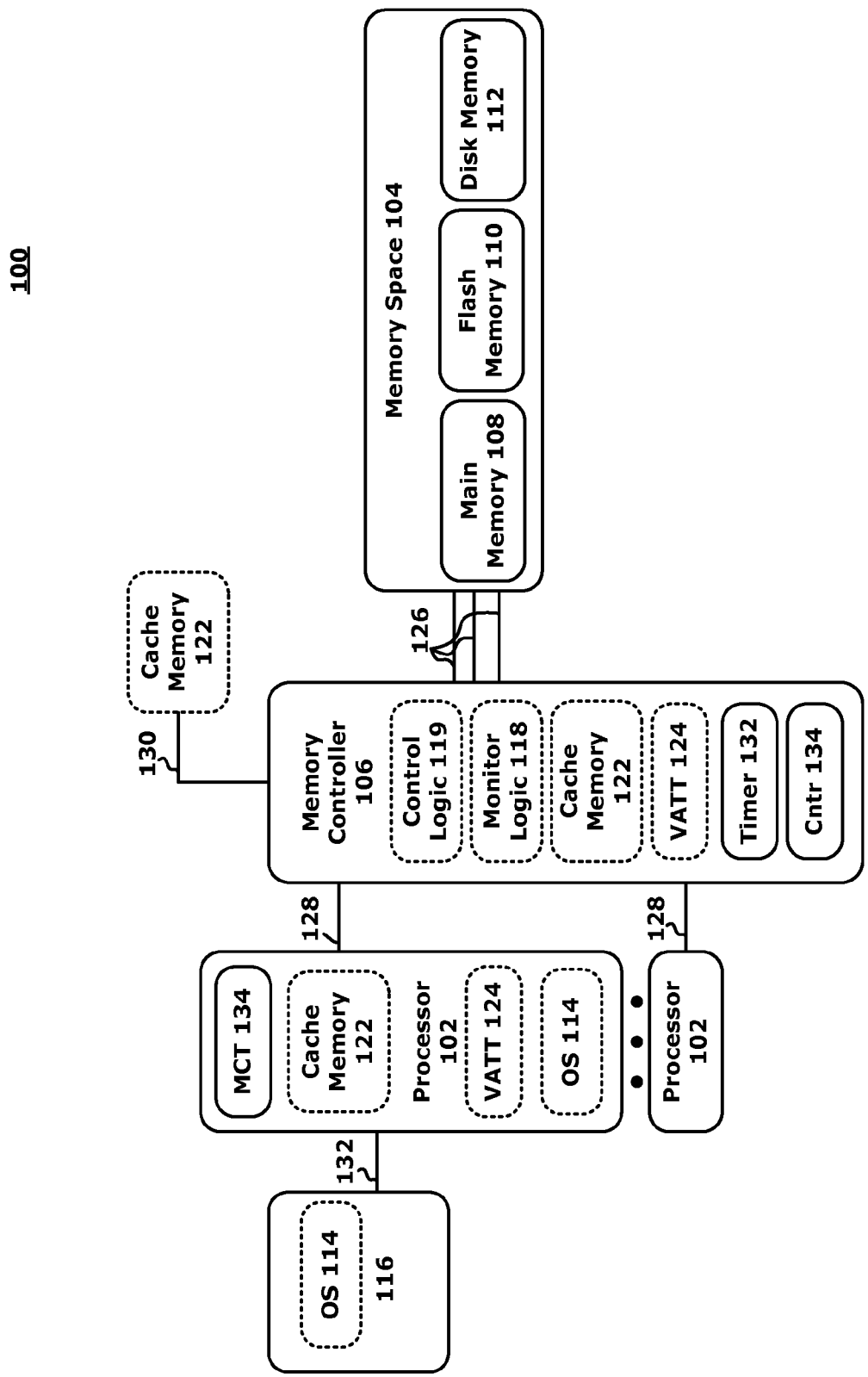
FIG. 2 is a diagram of an alternative computing system having a memory space of multiple memory types, according to various embodiments.

FIG. 2 is a diagram of a computing system 100 having multiple memory types, according to various embodiments. In various embodiments system 100 may be a further embodiment of computer system 10, other computer system, mobile device, server, or other electronic device. With reference to FIG. 2, system 100 may include a processor 102 for executing instructions, a memory controller 106 for managing data, and memory space 104 for storing data.

The processor 102 is coupled to memory controller 106 via one or more interconnects 128 (e.g., busses, channels, etc). In certain embodiments system 100 may be a multiprocessor or multi host system where more than one processor or host executes instructions and shares memory space 104.

The memory space 104 includes a plurality of memory types, such as main memory 108 (e.g., DRAM, SRAM, MRAM, flash, etc) and various types of other high-density memories (e.g., disk memory 112, flash memory 110, etc). In one embodiment, the memory space 104 could include an array of main memory chips. In another embodiment, the memory space 104 could include several different memory devices, including a combination of: on-chip memory, on-board memory, main memory, flash memory, disk memory, etc.

Memory controller 106 and/or I/O controller(s) 26 (not shown in FIG. 2) may be connected to memory space 104 via one or more interconnects 126 having one or more appropriate interfaces (e.g., DRAM, SRAM, MRAM, flash, SCSI, Fibre Channel, SAS, USB, Firewire, etc).

Memory controller 106 controls, organizes, or otherwise manages the transfer of data between processor(s) 102 and memory space 104. In various embodiments, the memory controller 106 is coupled to cache memory 122, main memory 108, flash memory 110, and disk memory 112. In response to a request from processor 102, memory controller 106 may write data to an appropriate memory type. Further after data has been written, in response to a request, the memory controller 106 may retrieve data stored in a first memory type and write the data in a second memory type. In other words, memory controller 106 may move or migrate the data between memory types. Memory controller 106 may utilize a timer 132 and counter 134 to determine when or if the data should be migrated. For example, data may be retrieved from the disk memory 112 and stored in the main memory 108 after a threshold read count has been reached or if there has been a threshold number of reads within a specified time.

Though one memory controller 106 is depicted in FIG. 2, multiple controllers may be utilized. For instance there may be a memory controller dedicated to controlling data transfer to main memory 108, another memory controller dedicated to controlling data transfer to flash memory 110, and another memory controller dedicated to controlling data transfer to disk memory 112. The multiple memory controllers may be interconnected so that data may be transferred from one memory type to another memory type at the memory controller 106 level, without being routed through the processor or host level. During an initial write, data may be routed through the one or more memory controllers or I/O controllers to be stored in the designated or determined memory classification or memory type.

In other embodiments the system 100 may include a cache memory 122 (e.g., Level 2 cache, Level 3 cache, etc) that serves as the temporary storage device. In such embodiments, the cache memory 122 may be coupled to and/or included in the processor 102 or may be coupled to (via interconnect 130) and/or included in memory controller 106.

In certain embodiments system 100 may include a monitoring device for identifying memory locations that are characterized as frequently, infrequently, or never written to, the power characteristics of those memory locations, and/or the write costs and read costs of the memory locations. Since memory locations may be classified by latency class, power class, or write/read cost classes, memory controller 106 may utilize these classifications to efficiently manage the storage of data within memory space 104. In certain embodiments these or more classifications for each memory type or memory class are maintained in a memory characteristic table (MCT) 134.

In some embodiments, the processor 102 may serve as the monitoring device by executing software. Such software may be included in an operating system 114 (OS) executed by the processor 102. In some embodiments, the OS 114 may be stored in a read-only memory (ROM) 116 connected (via interconnect 132) or integral to processor 102.

Alternatively, system 100 may include monitoring logic 118 and control logic 119 that serves as the monitoring device and/or controlling device. The memory controller 106, monitoring logic 118, and/or control logic 119 may include any suitable combination of logic, registers, memory or the like. In some embodiments, the memory controller 106 includes the monitoring logic 118 and/or control logic 119 (although, the monitoring logic 118 and/or control logic 119 may be located elsewhere). In some embodiments control logic 119 regulates computer system resources including cache memory 122 and main memory 108 by allocating memory to an application throughout its runtime via memory controller 106.

In certain embodiments system 100 also includes a virtual address transition table VATT 124. In exemplary embodiments, entries in VATT 124 maintain states for defining how data identified by a virtual address is mapped to a physical location in memory space 104.

As noted above each memory type may have different read/write latencies. For example, read and write operations to the main memory 108 and a read operation to the flash memory 110 may be completed quickly. However, a write operation to the flash memory 110 relatively may take substantially more time than the above-mentioned operations. For example, read and write operations to the main memory 108 may be completed in nanoseconds. Similar to a read operation on the main memory 108, a read operation on the flash memory 110 may be completed in nanoseconds. However, in contrast to the main memory 108, a write operation to the flash memory 110 and a write or a read operation to disk memory 112 may require milliseconds to complete, and therefore, may result in long write or read latency.

In some embodiments system 100 includes disk memory 112 and flash memory 110, which are denser, less expensive and consumes less power than main memory 108 for performing a read operation. Therefore, some embodiments may allow more memory to be coupled to the processor 102 than a conventional computer system with a main memory which only consists of, for example, DRAM.

Figure 3:
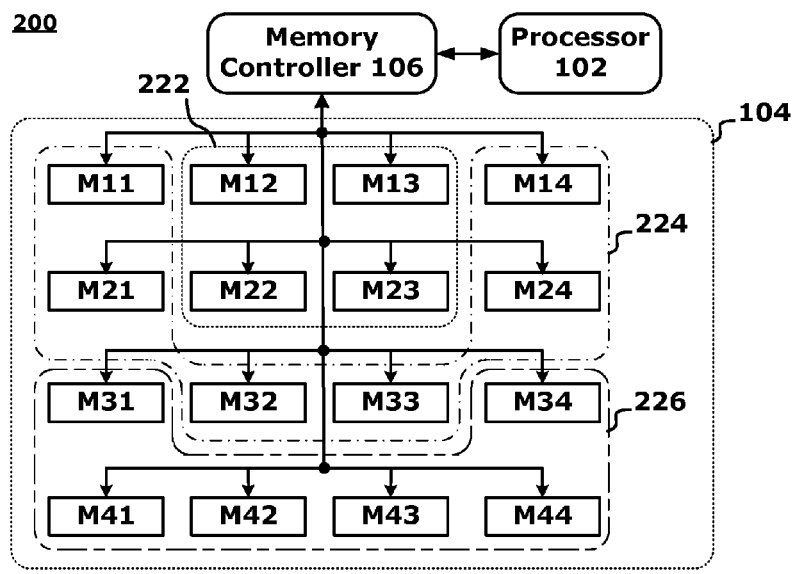
FIG. 3 is a diagram of a computing system having multiple memory classes, according to various embodiments.

FIG. 3 is a diagram of a computing system 200 having multiple memory classes, according to various embodiments. In various embodiments system 200 may be a further embodiment of computer system 10 or 100, another computer system, mobile device, server, or other electronic device. Computing system 200 includes processor 102, memory controller 106, and memory space 104. In certain embodiments memory space 104 can be grouped in terms of different physical memory units. For example memory units as shown are designated M11 through M44, in which the first numeral designates a row and the second numeral designates a column. The memory units could, for example, correspond to different characteristics (e.g., memory types, to different latency classes, to different power classes, to different write/read cost classes, or to different memory location classes, etc). It should be noted the representation shown in FIG. 3 is simplified to facilitate ease of understanding and that many commercial embodiments could be considerably more complicated.

In certain embodiments one or more memory characteristics are determined either through direct measurement or simulation and each of the individual physical memory unit is grouped into one of a plurality of groups (i.e., 222, 224, 226) according to the one or more characteristics. In various embodiments groups 222, 224, and 226 represent different characteristics (i.e. latency groups, power groups, etc).

For example, memory units M12, M13, M22 and M23 are grouped in a fast latency group 222. This could be, for example, because they are physically close to the memory controller 106 or because they employ a faster technology than the other memory locations, or a combination of the two. A medium latency group 224 includes memory locations M11, M21, M32, M33, M24, and M14. A slow latency group 226 includes memory locations M31, M41, M42, M43, M44 and M34.

In another example memory units M12, M13, M22 and M23 are grouped in a lower power group 222. A medium power group 224 includes memory locations M11, M21, M32, M33, M24, and M14. A high power group 226 includes memory locations M31, M41, M42, M43, M44 and M34.

Though only a memory controller 106 is depicted in FIG. 3 in other embodiments multiple memory controllers 106 or other memory type controllers (e.g., I/O controller 26) may be utilized.

Figure 4A:
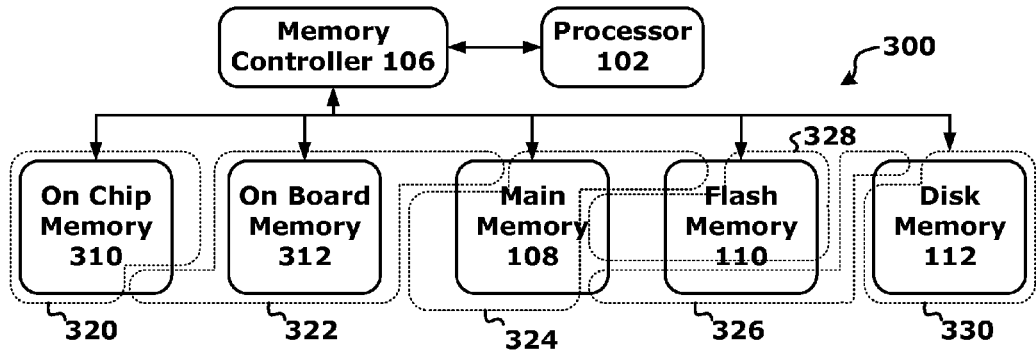
FIGS. 4A, 4B, and 4C depict examples of logically organizing a memory space that has multiple different memory types, according to various embodiments.
Figure 4B:
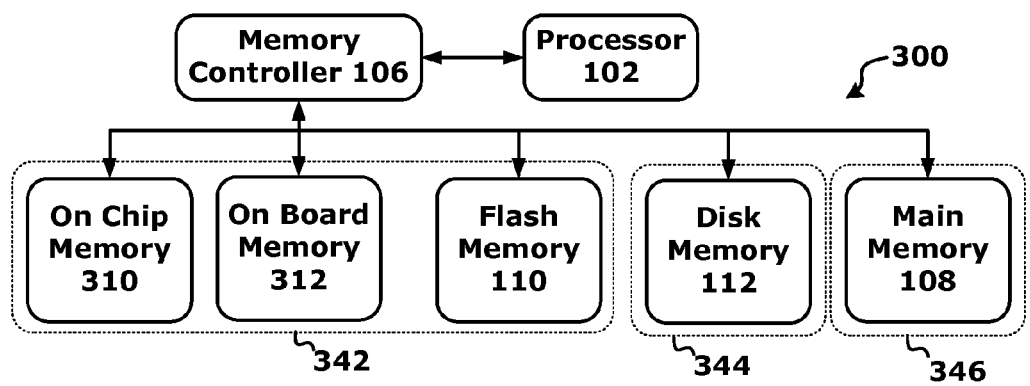
Figure 4C:
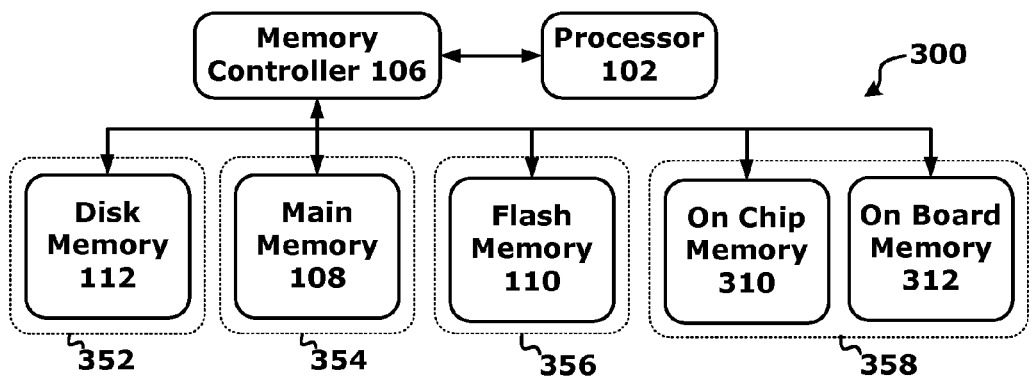

FIGS. 4A-4C are diagrams of a computing system 300 having multiple memory types, according to various embodiments. In various embodiments system 300 may be a further embodiment of computer system 10 or 100, another computer system, mobile device, server, or other electronic device. As shown in FIG. 4A, a system 300 includes processor 102, memory controller 106, on chip memory 310, on board memory 312, main memory 108, flash memory 110 and disk memory 112. It is possible to group the memory types according to one or more characteristics, depending on the application.

For example an organizational grouping may comprise a fastest group 320 (which includes only on chip memory 310), a next fastest group 322 (which includes a slower portion of the on chip memory 310, all of the on board memory 312 and a low-latency portion of the main memory 108), a medium latency group 324 (which includes most of the memory locations from the main memory 108 and the faster portions of the flash memory 110), a medium slow latency group 328 (which includes slower portions of the main memory 108 and most of the flash memory 110), a slow latency group 326 (which includes the slowest portions of the main memory 108, the slowest portion of the flash memory 110 and the fastest portion of the disk memory 112), and a slowest latency group 330 (which includes most of the disk memory 112). In this scenario, the data units could be stored according to six different latency characteristics.

In other embodiments the memory space 104 may be grouped based on one or more other characteristics. For example in FIG. 4B, the memory types are grouped in as many different power classes as desired, depending on the application. The group may include a low power group 346 (which includes on chip memory 310, on board memory 312, and flash memory 110), an intermediate power group 344 (which includes all of disk memory 112), and a high power group 346 (which includes all main memory 108). In another example as shown in FIG. 4C, the memory types are grouped in as many different write and/or read cost classes as desired, depending on the application. The group may include a lowest write/read cost group 352 (which includes all of disk memory 112), an low write/read cost group 354 (which includes all main memory 108), a medium write/read cost group 356 (which includes all of flash memory 110), and a high write/read cost group 358 (which includes all of on chip memory 310 and all of on board memory 312).

Though only a memory controller 106 is depicted in FIGS. 4A, 4B, and 4C in other embodiments multiple memory controllers 106 or other memory type controllers (e.g., I/O controller 26) may also be utilized.

The memory characteristics of the memory space 104 (e.g., latency groups, power groups, and/or read/write groups, etc) may be determined (e.g., direct measurement or simulation) by monitoring logic 118 or the monitoring device generally and may be communicated to control logic 119, processor 102, or to OS 114, etc. Alternatively the memory characteristics may be previously known (e.g., architected into the system, etc). These memory characteristics may be stored and tracked in MCT 134.

In FIG. 5A and FIG. 5B exemplary memory characteristic tables 134 are shown. MCT 134 documents or otherwise associates the memory characteristics to one or more memory location(s). Once the organizational characteristics are determined or are otherwise known, the information is inserted into MCT 134 and is provided to for example, memory controller 106, OS 114 or other trusted entity such as a hypervisor, or processor 102, etc.

The MCT 134 is utilized by the memory controller 106, OS 114, hypervisor, processor 102, or other trusted entity to determine a memory type and/or location within the memory type to write data. In certain embodiments the memory controller 106, OS 114, hypervisor, processor 102, or other trusted entity determines a suggested memory type and/or memory location using information associated with the data to be written, as further discussed below, and may further interrogate the MCT 134 to determine a memory unit or memory address range to write the data to.

Because the memory characteristics are known, memory controller 106 may manage or route the data to memory space 104 in an organized or efficient matter. If memory capacity changed or if memory is added or removed from the system, MCT 134 is updated accordingly. In some embodiments MCT 134 may be a dynamic table since the value of the characteristics tracked in MCT 134 may frequently change.

As shown in FIG. 5A memory units are associated with their respective latency, power consumption, write cost, and read cost characteristics. For example a memory unit 'M44' has a slowest latency, a middle level of power consumption costs, a low write cost, and a low read cost.

As shown in FIG. 5B memory address, or alternatively a range of memory address, are associated with a write priority. For example memory addresses '9B451-9B999' have the highest write priority characteristic (e.g., write to these addresses first, etc) and memory addresses '4K299-4K999' have a low write priority characteristic (e.g., write to these address last, etc). Data may be subsequently written to those memory locations having capacity, according to the designated priorities.

It is noted that the information in MCT 134 may be in a natural language, binary language, etc, and that other memory characteristics may be used in addition to or in lieu of those characteristics shown in FIGS. 5A and 5B.

MCT 134 may be updated, refreshed, or otherwise changed as needed based as determined for example by monitor logic 118. For instance MCT 134 may be updated when the associated electronic system is utilized less than a threshold level (i.e. the entries in MCT 134 may be different at peak performance levels than at low or slow performance levels). MCT 134 may also be updated when one or more memory units or address ranges become protected, damaged, removed, or otherwise unusable. In other instances, MCT 134 may be updated at fixed time intervals (e.g., every 20 seconds, every 6 minutes, every 2 hours, etc). In still other embodiments MCT 134 may indicate memory unit or memory address range availability (e.g., only available memory units or memory address ranges are listed, etc) and as a result MCT 134 may be updated when that memory unit or memory address range is no longer available. The plurality of reasons that MCT 134 may or should be updated may components used in an MCT 134 mapping ruleset that governs the overall MCT 134 mapping/updating systems and processes.

FIG. 6 depicts an exemplary VATT 124 that is utilized to map virtual address 506 to a physical address 514 within memory space 104. VATT 124 may also associate hint 508 information to the virtual address 506. Hint 508 may capture memory characteristic information such that data may be stored and/or managed within memory space 104 according to a policy scheme. Hint 508 may be added to the VATT 124 by various entitles (e.g., by OS 114, processor 102, memory controller 106, etc).

In various instances virtual address 506 within VATT 124 will be a certain fixed length address. However in other instances virtual addresses 506 within VATT 124 may be of different lengths. For example an OS on a first partition may have an architecture that utilizes virtual addresses 506 of eight characters. A second partition may be running another OS that utilizes virtual addresses 506 of ten characters. In fact, in certain instances the virtual address 506 may be so long that there may not be space for a hint 508. Therefore, in these instances, the length or space available of hint 508 to store characteristic data may differ from one virtual address 506 compared to another virtual address 506.

In an embodiment hint information 508 is captured in an excess portion 606 of virtual address 506. Excess portion 606 is one or more sections of a virtual address 506 that are non-functional, are redundant, or are otherwise unused. In certain instances excess portion 606 is designed into the system to allow for bring-up testing or for other reasons. In certain embodiments, only when excess portion 606 exists does memory characteristic information get stored and associated with a virtual address 506. In this manner the information stored within excess portion 606 may be used as hint 508 by memory controller 106 to store and/or manage data within memory space 104 according to a policy scheme.

Figure 7A:
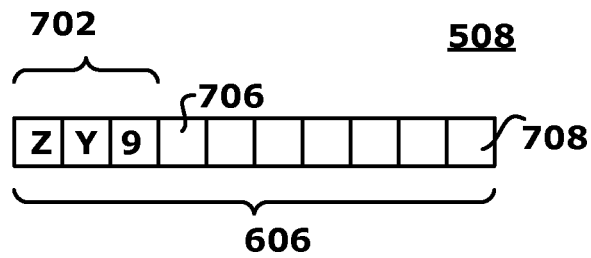
FIGS. 7A, 7B, and 7C depict exemplary excess portions of a virtual address that may be used to capture hint information, according to various embodiments.
Figure 7B:
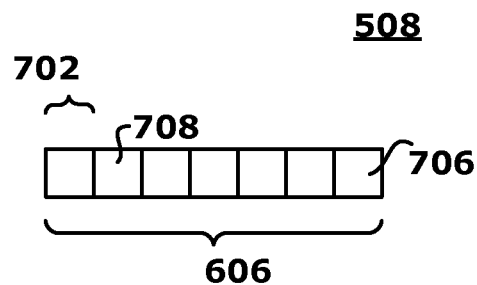
Figure 7C:
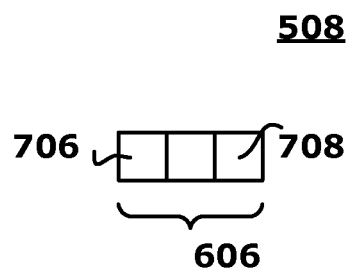

FIGS. 7A, 7B, and 7C depict exemplary embodiments of various excess portions 606. In FIGS. 7A and 7B, excess portion 606 includes an identifier 702 and may be utilized to identify excess portion 606. Hint information 508 may be written from a first cell 706 to a last cell 708. In certain embodiments identifier 702 may be a string of all characters (e.g., FIG. 7A, etc), one of more blanks (FIG. 7B, etc), a combination of characters and blanks, and may be of a fixed or variable length. FIG. 7C depicts an embodiment where identifier 702 is not utilized (e.g., when the location or position of excess portion 606 is known or is predetermined, etc).

FIG. 8A depicts a detailed view of an exemplary VATT 800. VATT 800 maintains, within excess portion 606, memory characteristic information associated with memory space 104. Depending upon the length of excess portion 606, memory characteristics may include an historical 802, an O/S direction 804, a data priority 806, a job priority 808, a job importance 810, a job category 812, a latency, a power, a write cost, and/or a read cost component, etc. The actual memory characteristic components that are tracked in a VATT may be modified depending upon the application and upon the size, length, or availability of excess portion 606.

Further, a user may give each memory characteristic component a weighting or a priority to give certainly categories more significance relative to other categories. For example historical 802, O/S direction 804, data priority 806, job priority 808, job importance 810, or job category 812 are given a priority from high to low respectively. In the present example, the excess portion 606 associated with virtual address 0M740 may have enough space to track two components. Therefore, history component 802 and O/S direction component 804 are tracked within VATT 800.

In certain embodiments, historical component 802 indicates whether or not the data associated with the virtual address 506 should be written to a similar memory type or classification, relative to the immediate prior write operation. For example, the data associated with virtual address 0M741 should be written to the same memory type or classification relative to the data associated with virtual address 0M740. In other words, the memory type or classification for a current write should be repeated relative to the past prior write. Historical component 802 may also indicate that a current write should not be repeated relative to the past prior write. In other embodiments historical component 802 indicates to which memory type or class similar past data was written or migrated.

O/S direction component 804 indicates a suggested memory type or classification for writing data as is directed by OS 114 or otherwise by processor 102. For example OS 114 suggests that virtual address 0M742 should be written to a medium latency class, a specific memory type, etc. In certain embodiments OS 114 considers the latency, power, write cost, and read cost classifications of the available memory class/type when determining the O/S direction component 804.

Data priority component 806 tracks the priority of the data to be written. For example the data associated with virtual address 0M743 is a 'medium' priority. The priority associated with data may dictate the memory type the data should be written to. Depending upon the priority of the data to be written, the data may be written to differing memory types or classes.

Job priority 808, job importance 810, and job category 812 components track different aspects of the job that is associated with the data. These aspects may dictate the memory type or class the data should be written to. For example the data associated with virtual address 0M744 has a low job priority 808 aspect, the data associated with virtual address 9K930 has a low job importance 810 aspect, and the data associated with virtual address 2Y936 has a mid job priority 812 aspect.

FIG. 8B depicts a detailed view of another exemplary VATT 820. VATT 820 maintains memory type component 801 information associated with virtual addresses 506. In certain embodiments (e.g., where excess portion 606 is small, etc) only a limited amount of information may be tracked, and the VATT 820 is minimized.

Memory type component 801 indicates the suggested memory type or memory class that data should be written to. For example the information in excess portion 606 associated with virtual address 3V374 indicates that the data should be written to a memory type having a slow latency classification. The information in excess portion 606 associated with virtual address 0Q388 should be written to a memory type having a medium latency classification. And the information in excess portion 606 associated with virtual address 7Z475 should be written to a memory type having a fast latency classification.

Since the information in excess portion 606 may indicate multiple different memory types or memory classifications, the information within excess portion 606 is considered by the system (e.g., memory controller 106, control logic 119, processor 102, or OS 114, etc) in resolving or otherwise determining a single suggested memory type or memory classification. When a single memory type is determined the system (e.g., memory controller 106, etc) initiates writing the data to the specified memory type or memory classification (e.g., memory controller 106 moves the data from cache memory 122 to flash memory 110, etc).

In certain embodiments after the memory write (e.g., data has been stored) the excess portion 606 may be further used to determine when or if the data should be migrated to a more appropriate memory type, or to a different memory latency class, etc.

In certain embodiments subsequent to determining the resolved memory type or memory class, excess portion 606 may be used to track post-write information. In other words, once the information in excess portion 606 is used to determine the resolved memory type, the information is no longer needed. Therefore, this information may be disregarded, and the excess portion 606 may be utilized not to track write-to information (as it did previously) but instead to track post-write information. In other embodiments another VATT is established to track post-write information.

FIG. 9 depicts a detailed view of another exemplary VATT 900. VATT 900 tracks post-write information to be used by the system to determine if, when, and where data should be migrated to a different memory type or memory class. The information tracked in VATT 900 may be, for example, memory type 801, usage frequency 902, data age 904, data priority 906, job priority 908, job importance 910, job category 912, etc. components, though more or fewer components may be tracked.

Memory type component 801 indicates the memory type or memory class where the data associated with the virtual address is currently stored. Therefore, instead of interrogating the physical memory device(s) to determine the memory type for a particular virtual address 506, this information may be gathered by an inquiry to VATT 900. When data is moved from a first memory type/class to a second memory type/class, memory component 801 is updated to indicate the second memory type/class.

Usage frequency component 902 indicates how frequency data has been accessed. In certain embodiments, the system may assign data (which could denote anything from individual bytes of data to pages or other groupings) to memory locations based on the level of usage of the data. Thus, for example, data that have a relatively high usage frequency would be stored in memory locations in the fast latency group 222, data units that have a relatively moderate usage frequency would be stored in memory locations in the medium latency group 224, and data units that have a relatively low usage frequency would be stored in memory locations in the slow latency group 226.

In certain embodiments, the frequency to which data is written to a particular memory type or memory class is tracked in usage frequency component 902 (e.g., a frequency count is tracked, a frequency usage classification is kept (high, med, low, etc). For example, the memory controller 106, utilizing counter 134 increments the usage frequency component upon each access of the data associated with the virtual address or after a threshold number of accesses have occurred. If data was stored in a first memory location but has recently been frequently accessed it may be appropriate to migrate the data to a memory type having a faster latency class. When data is migrated from the first memory type to a second memory type the frequency component 902 is reset. If tracked, memory component 801 is updated to indicate current memory type.

There may be instances where the system tracks the age of data. The memory controller 106 assigns data units representing the length of time since the data was stored to a memory type (e.g., young, old, or an actual time value, etc). For example, data units that have are relatively young (e.g., recently stored) would be stored in memory locations in the fast latency group 222, data units that are moderately old would be stored in memory locations in the medium latency group 224, and data units that are old would be stored in memory locations in the slow latency group 226.

In certain embodiments, data age is tracked in data age 904 component. For example, the memory controller 106, utilizing timer 132 increments the data age component 904 upon each access of the data associated with the virtual address 506 or upon a threshold amount of time after data storage in a memory type. If data was stored in a first memory location but has but has not been accessed for a threshold amount of time, it may be appropriate to migrate the data to a memory type having a slower latency class. When data is migrated from the first memory type to a second memory type data age component 904 is reset. If tracked, usage frequency component 902 is reset and memory component 801 is updated to indicate the slower memory type.

Data priority component 906 indicates the priority or otherwise importance of the data associated with the virtual address 506. For example, data that is critical is assigned a high priority and may be stored in a more stable memory type, stored in multiple storage locations, etc. The system may update the priority component 906 if the priority of the data changes (e.g., data priority component 906 for a data set has become high when a redundant copy of the data set is lost, data priority component 906 has become low since it is no longer critical system data, etc). When data priority component 906 is changed, VATT 900 is updated. If memory type component 801 is being tracked, and if data is moved from a first memory type/class to a second memory type/class due to a changing data priority component 906, memory component 801 is updated to indicate the current memory type/class. If other components are being tracked and are changed due to a modified priority component 906 those components are also updated in VATT 900.

Job priority 908, job importance 910, and job category 912 components track different classifications of the job that is associated with the data. These classifications associated with data may dictate the memory type the data should be migrated to.

Please note that in certain embodiments, VATT 800, VATT 820, VATT 900, etc. may be populated by memory controller 106, by processor 102, by OS 114, or by another entity such as a hypervisor, partition manager, etc, as appropriate. It is also noted that the information in a VATT may be in a natural language, binary language, etc, and that other memory characteristics may be used in addition to or in lieu of those characteristics shown in the FIGs.

Figure 10:
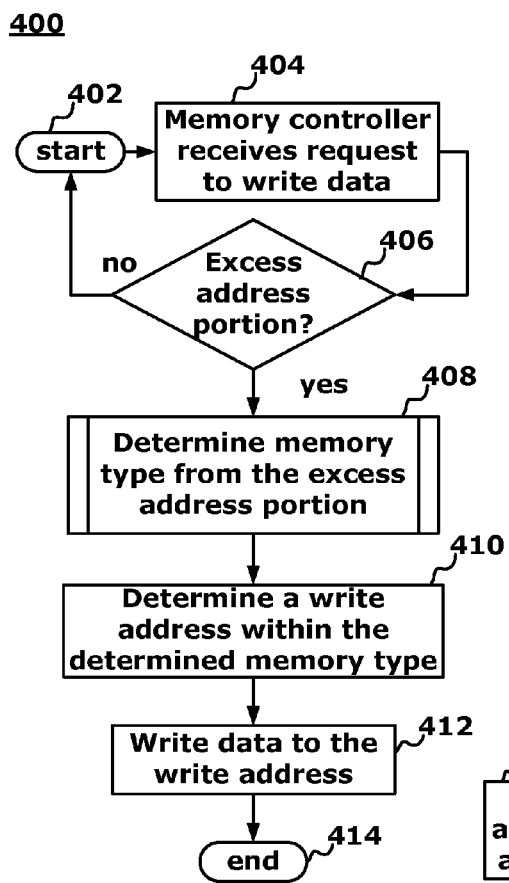
FIG. 10 depicts a method of writing or storing data according to various embodiments.

FIG. 10 depicts a method 400 of writing or storing data according to an embodiment. Method 400 begins at block 402. Memory controller 106 receives a request to write data associated with an address from, for example, processor 102, OS 114, etc (block 404). It is determined whether there is an excess portion 606 associated to the address (block 406). A memory type is determined from the information in the excess portion 606 (block 408). A write-address or location within the determined memory type is determined (block 410). The data is written to the write-address (block 412). Method 400 ends at block 414.

Figure 11A:
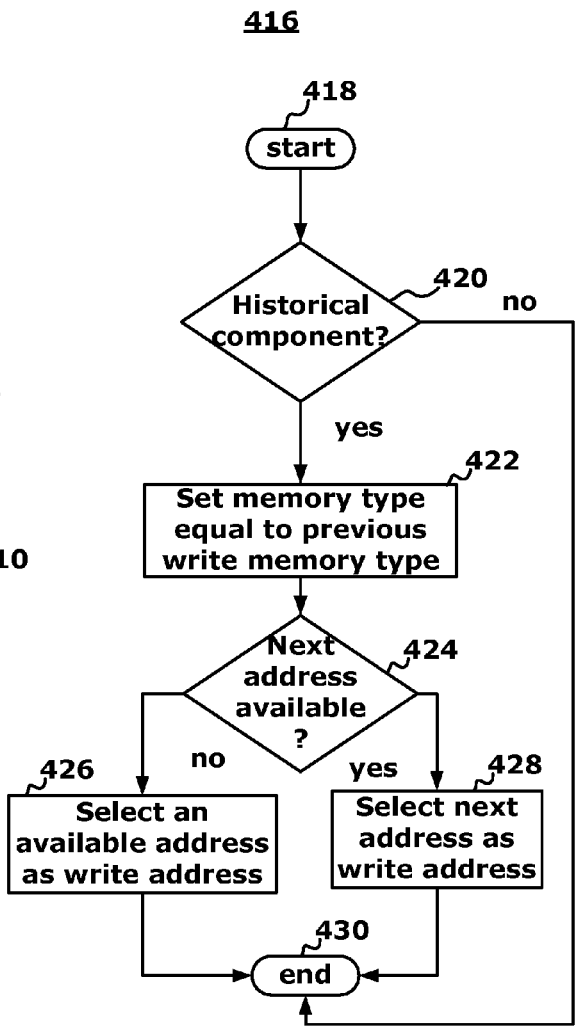
FIG. 11A, 11B, 11C, 11D, 11E, 11F, 11G also depict methods of writing or storing data, according to various embodiments.

FIG. 11A depicts a method 416 of writing or storing data according to an embodiment. Method 416 begins at block 418. Memory controller 106 determines if there is a historical component 802 associated with a write request (block 420). If there is no historical component 802, method 416 ends at block 430. If historical component 802 is present, memory controller 106 sets a memory type equal to the memory type of the previous write (block 422). The memory controller determines if a next physical address or location is available within the determined memory type (block 424). If the next physical address is available the memory controller 106 selects the next physical address as the write address (block 428). If the next physical address is not available the memory controller 106 selects an available physical address within the determined memory type as the write address (block 426). The VATT is updated associating the virtual address 506 with the physical address. Method 416 ends at block 430.

Figure 11B:
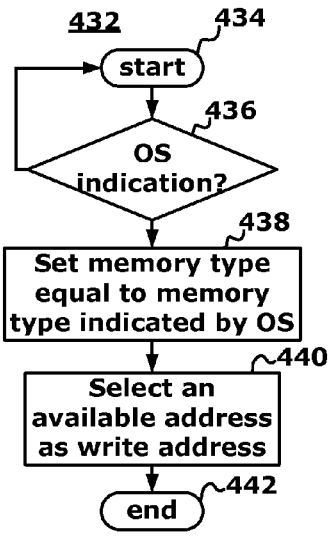

FIG. 11B depicts a method 432 of writing or storing data according to an embodiment. Method 432 begins at block 434. Memory controller 106 determines if there is a O/S direction component 804 associated with a write request (block 436). If there is no O/S direction component 804, method 432 ends at block 442. If O/S direction component 804 is present, memory controller 106 sets the memory type equal to the memory type indicated by the OS 114 (block 438). The memory controller 106 selects an available physical address within the selected memory type as the write address (block 440). The VATT is updated associating the virtual address 506 with the physical address. Method 416 ends at block 442.

Figure 11C:
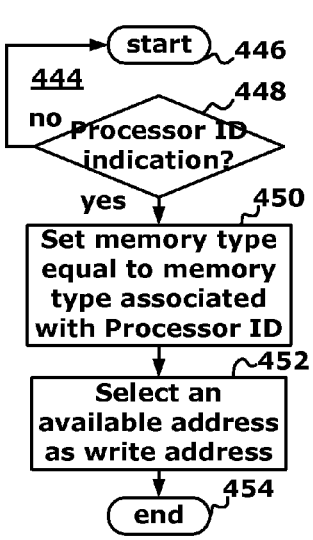

FIG. 11C depicts a method 444 of writing or storing data according to an embodiment. Method 444 begins at block 446. Memory controller 106 determines if there is an identification (ID) component (e.g., processor ID, host ID component, partition ID, etc) associated with a write request (block 436). ID component tracks the identifier that originates the I/O request. The ID component may be tracked similar to the other components in VATT 800 and/or VATT 900. The data associated with the ID component may be stored differently depending upon the ID (e.g. stored in a specified memory type, stored within a predetermined storage partition, etc).

If there is no ID component, method 444 ends at block 454. If the ID component is present, memory controller 106 sets the write-to memory type equal to the memory type either indicated or determined by the ID component (block 450). The memory controller 106 selects an available physical address within the selected memory type as the write address (block 452). The VATT is updated associating the virtual address 506 with the physical address. Method 444 ends at block 454.

Figure 11D:
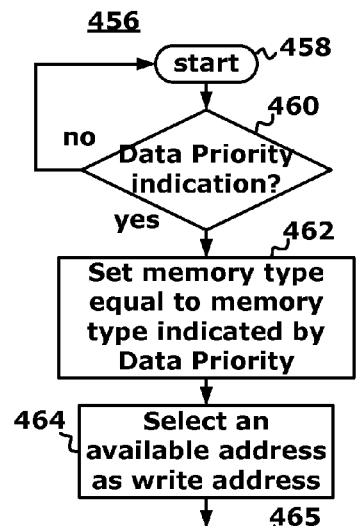

FIG. 11D depicts a method 432 of writing or storing data according to an embodiment. Method 456 begins at block 458. Memory controller 106 determines if there is a data priority component 806 associated with a write request (block 460). If there is no data priority component 806 method 456 ends at block 462. If data priority component 806 is present, memory controller 106 sets the memory type equal to the memory type indicated or determined utilizing data priority component 806 (block 462). The memory controller 106 selects an available physical address within the selected memory type as the write address (block 464). The VATT is updated associating the virtual address 506 with the physical address. Method 416 ends at block 465.

Figure 11E:
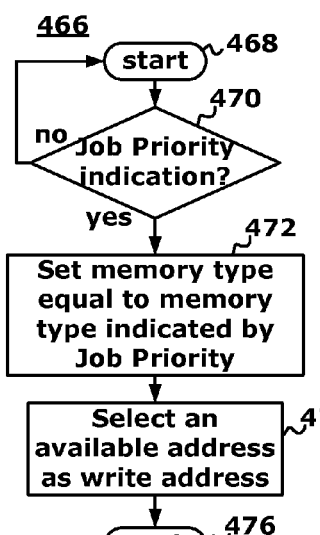

FIG. 11E depicts a method 466 of writing or storing data according to an embodiment. Method 466 begins at block 468. Memory controller 106 determines if there is a job priority component 808 associated with a write request (block 470). If there is no job priority component 808, method 466 ends at block 476. If job priority component 808 is present, memory controller 106 sets the memory type equal to the memory type indicated by or determined utilizing job priority component 808 (block 472). The memory controller 106 selects an available physical address within the selected memory type as the write address (block 476). The VATT is updated associating the virtual address 506 with the physical address. Method 466 ends at block 476.

Figure 11F:
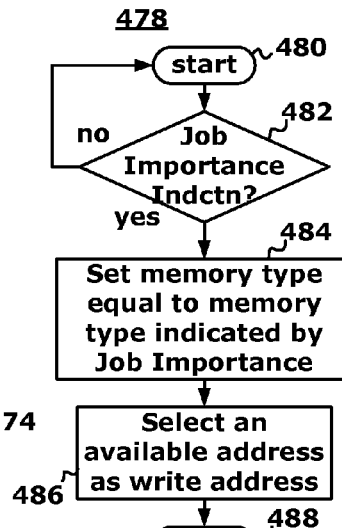

FIG. 11F depicts a method 478 of writing or storing data according to an embodiment. Method 478 begins at block 480. Memory controller 106 determines if there is a job importance component 810 associated with a write request (block 482). If there is no job importance component 810, method 478 ends at block 488. If job importance component 810 is present, memory controller 106 sets the memory type equal to the memory type indicated by or determined utilizing job importance component 810 (block 484). The memory controller 106 selects an available physical address within the selected memory type as the write address (block 486). The VATT is updated associating the virtual address 506 with the physical address. Method 478 ends at block 488.

Figure 11G:
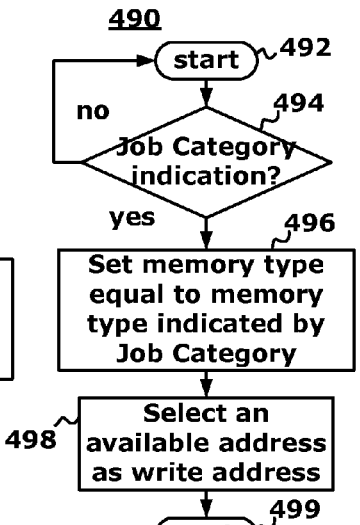

FIG. 11G depicts a method 490 of writing or storing data according to an embodiment. Method 490 begins at block 492. Memory controller 106 determines if there is a job category component 812 associated with a write request (block 494). If there is no job category component 812, method 490 ends at block 499. If job category component 812 is present, memory controller 106 sets the memory type equal to the memory type indicated by or determined utilizing job category component 812 (block 496). The memory controller 106 selects an available physical address within the selected memory type as the write address (block 498). The VATT is updated associating the virtual address 506 with the physical address. Method 478 ends at block 499.

Figure 12:
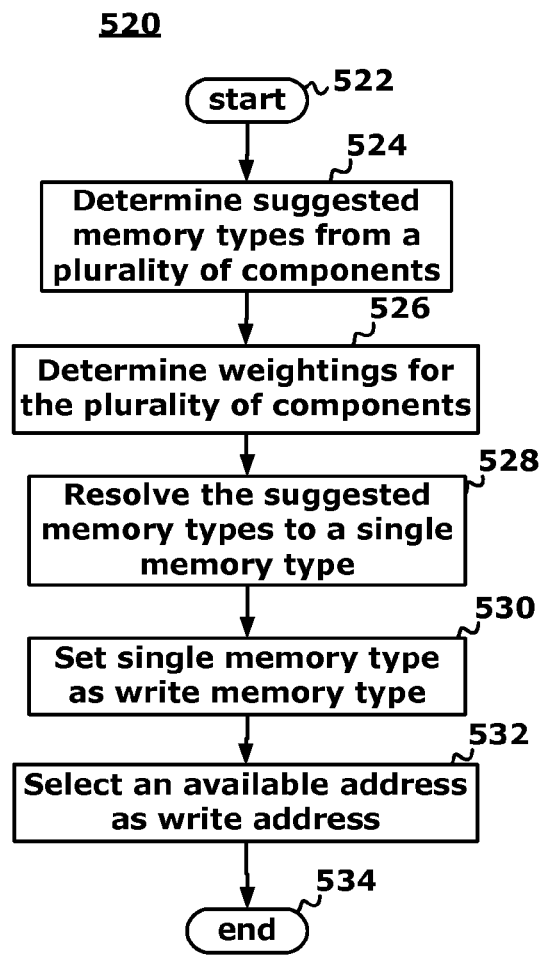
FIG. 12 depicts a method for resolving or determining a single memory type utilizing hint information, according to various embodiments.

FIG. 12 depicts a method 520 for resolving or determining a single memory type utilizing hint information 508, according to an embodiment. Method 520 or an individual block(s) of method 520 may be utilized by control logic 119, monitor logic 118 or by memory controller 106 generally to determine the write-to memory type.

Method 520 beings at block 522. Memory controller 106 determines a suggested memory type associated with each present component (e.g., historical 802, O/S direction 804, data priority 806, job priority 808, job importance 810, or job category 812, memory type 801, ID, latency, power, write cost, read cost, etc). Memory controller 106 determines a weighting or priority for each present component (block 526). Memory controller 106 resolves the suggested memory types associated with each present component to a single memory type (block 528). Memory controller 106 may designate the single memory type as the write-to memory type (block 530). Memory controller 106 may also select an available physical address or location within the write-to memory address (block 532). The VATT is updated associating the virtual address 506 with the physical address. Method 520 ends at block 534.

Figure 13:
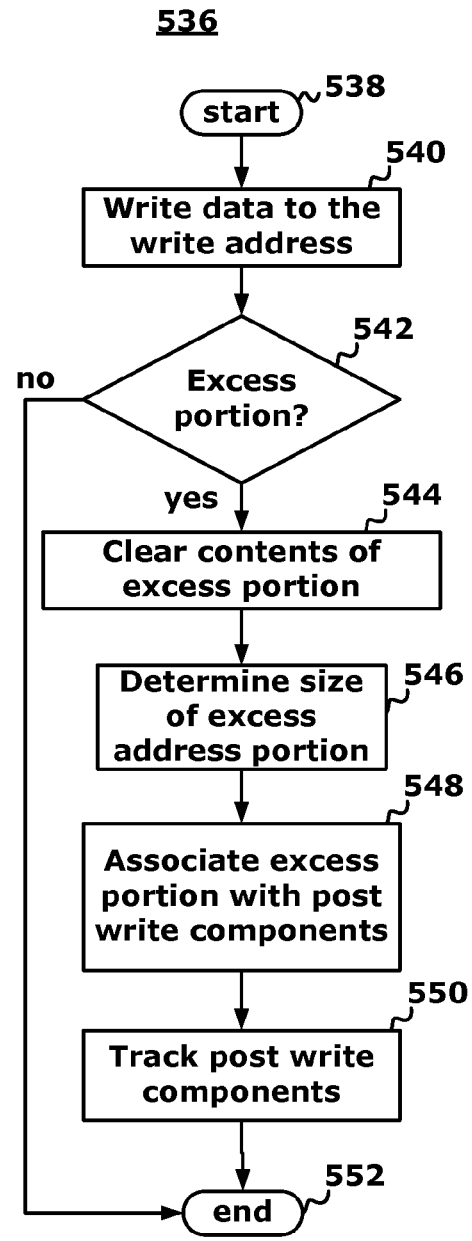
FIG. 13 depicts a method for tracking post write information, according to various embodiments.

FIG. 13 depicts a method 536 for tracking post write information according to an embodiment. Method 536 or an individual block(s) of method 536 may be utilized by control logic 119, monitor logic 118 or by memory controller 106 generally to track post write components associated with written data according to embodiments.

Method 536 begins at block 538 where data has been written to a memory (block 540). Memory controller 106 determines if an excess portion 606 is associated with the written data (block 542). If there is no excess portion associated with the written data, method 536 ends at block 552. If there is an excess portion 606 associated with the written data, the contents of the excess portion 606 may be cleared since the write-to memory type has been determined (block 544). In other embodiments of method 536, block 544 is skipped.

Memory controller 106 determines the length or size of the excess portion 606 (block 546). Depending upon the availability of excess portion 606 and the priorities of potential post write components, memory controller associates the excess portion 606 with one or more post write components (block 548). Memory controller 106 tracks the post write components (block 550). Method 536 ends at block 552.

Figure 14:
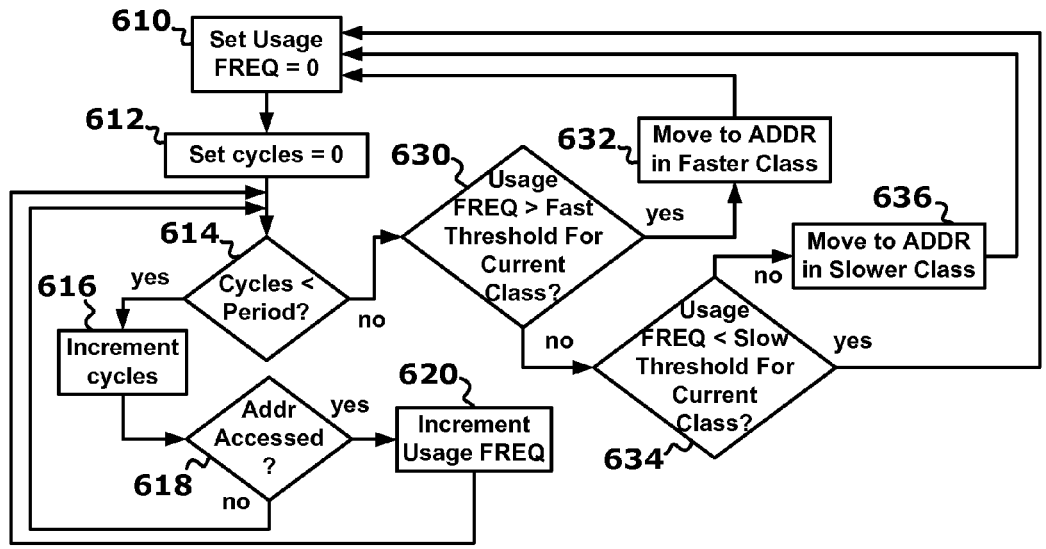
FIG. 14 depicts a method for performing post write operations associated with a usage frequency component, according to various embodiments.

FIG. 14 depicts a method 608 for performing post write operations associated with usage frequency component 902, according to an embodiment. Method 608 or an individual block(s) of method 608 may be utilized by control logic 119, monitor logic 118 or by memory controller 106 generally to track data access frequency according to embodiments.

Initially, each usage frequency is set to zero (block 610) and a cycle counter is set to zero (block 612). A test determines if a predetermined amount of time has ended (block 614). If not, a data access counter is incremented (block 616) and the system determines (block 618), for each memory address, whether the data was accessed during the current cycle. If the data was accessed, then the usage frequency corresponding to the data is incremented (block 620) and the system returns to block 614. If the data not was accessed, then the system returns directly to block 614. Once the predetermined amount of time has ended, the system determines (block 660) whether the usage frequency is greater than a "move up" threshold. If it is greater, then the data is moved to a memory type that has a faster latency class (block 632). If it is not greater, then the system determines (block 634) whether the usage frequency is less than a "move down" threshold. If it is less that the move down threshold, then data is moved to a memory type that has a slower latency class (block 636). Otherwise, the data unit is left where it is and the system returns to block 610.

Figure 15:
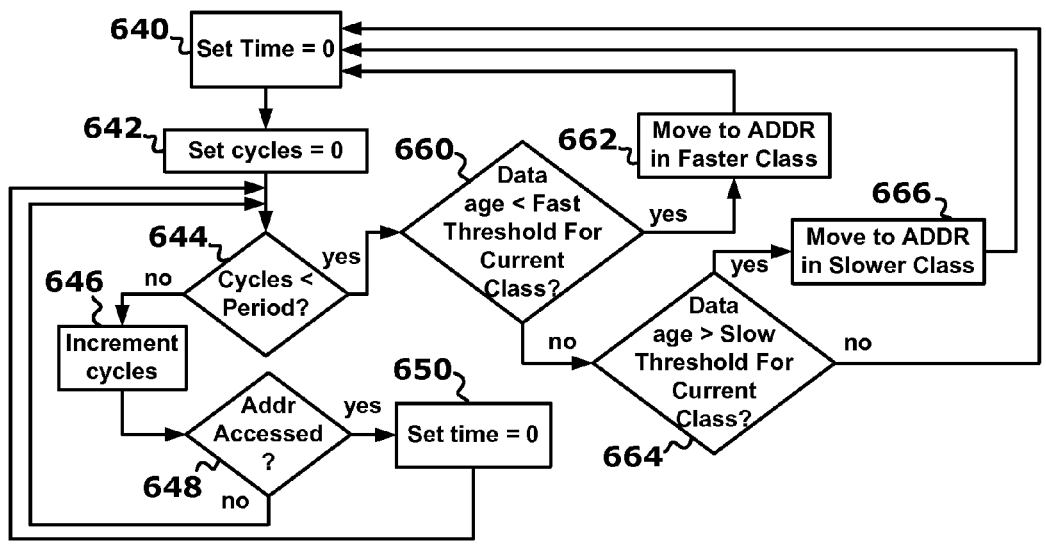
FIG. 15 depicts a method for performing post write operations associated with a data age component, according to various embodiments.

FIG. 15 depicts a method 638 for performing post write operations associated with usage data age component 904, according to an embodiment. Method 638 or an individual block(s) of method 638 may be utilized by control logic 119, monitor logic 118 or by memory controller 106 generally to track data age according to embodiments.

Initially, a data age timer is set to zero (block 640) and a cycle counter is set to zero (block 642). A test determines if a predetermined amount of time has ended (block 644). If not, the cycle counter is incremented (block 646) and the system determines whether the data was accessed during the current cycle (block 648). If the data was accessed, then the data age timer is set to zero or is otherwise reset (block 650) and the system returns to block 644. If the data not was accessed, then the system returns directly to block 644. Once the predetermined amount of time has elapsed, the system determines (block 660) whether the data age is less than a "move up" threshold. If it is greater, then the data is moved to a memory type that has a faster latency class (block 662). If it is not greater, then the system determines (block 664) whether the data age is greater than a "move down" threshold. If it is less that the move down threshold, then data is moved to a memory type that has a slower latency class (block 666). Otherwise, the data unit is left where it is and the system returns to block 640.

The "move up" and "move down" thresholds referred to in FIG. 14 and FIG. 15 can be static, based on a predicted number of data units within each usage frequency group, or they can be dynamic, which would allow the frequency usage groups to maintain a constant number of entries, but in which the membership criteria could change.

Figure 16:
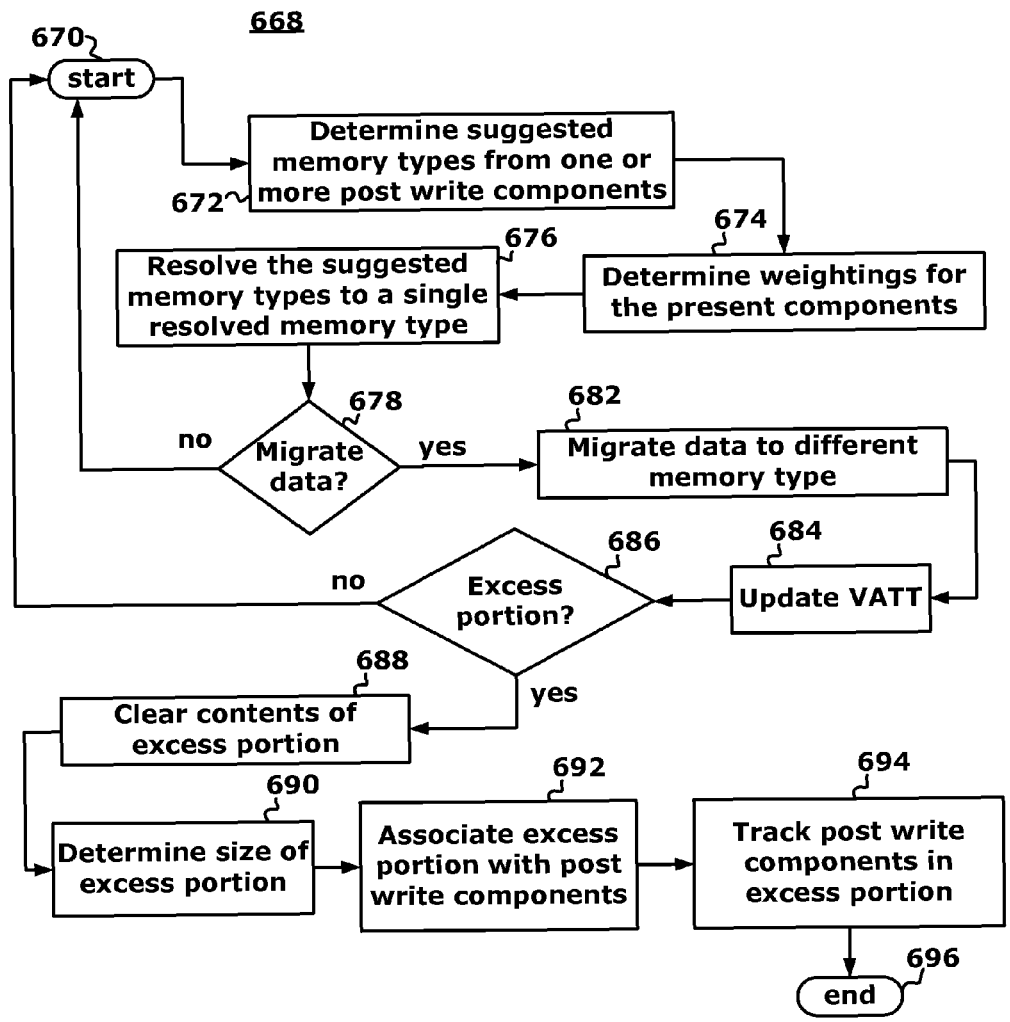
FIG. 16 depicts a method for migrating data from a first memory type or class to a second memory type or class, according to various embodiments.

FIG. 16 depicts a method 668 for migrating data from a first memory type/class to a second memory type/class according to embodiments. Method 668 or an individual block(s) of method 668 may be utilized by control logic 119, monitor logic 118 or by memory controller 106 generally to migrate data according to embodiments.

Method 668 begins at block 670. Memory controller 106 obtains the suggested memory types/classes indicated by the present post write components. For example usage frequency component 902 and data age component 904 may indicate that the data should be migrated to a memory type having a fast latency class, etc. Memory controller 106 determines the weightings for the present post write components (block 674) and resolves the suggested memory types to a single resolved memory type (block 676). Memory controller then determines whether to initiate a data migration (block 678) by comparing the current memory type (e.g., where the data is currently stored) to the resolved memory type. If the current memory type does not equal the resolved memory type a data migration is initiated and the data is migrated or moved to the resolved memory type (block 682). If the current memory type is equal to the resolved memory type, method 668 returns to block 670. The VATT is updated associating the applicable virtual address 506 with the new physical address.

In certain embodiments memory controller 106 may determine if an excess portion 606 is associated with the migrated data (block 686). If there is no excess portion associated with the written data, method 668 ends at block 670. If there is an excess portion 606 associated with the migrated data, the contents of the excess portion 606 may be cleared (block 688) since the memory type has been determined and the data has been migrated. In other embodiments of method 668, block 688 is skipped. Memory controller 106 determines the length or size of the excess portion 606 (block 690). Depending upon the availability of excess portion 606 and the priorities of potential post write components, memory controller 106 associates the excess portion 606 with one or more post write components (block 692). Memory controller 106 tracks the post write components (block 692). Method 536 ends at block 552.

It is to be understood that an embodiment includes elements that may be implemented on or within at least one electronic enclosure, such as general-purpose server running suitable software programs.

Although illustrative embodiments have been described herein with reference to the accompanying drawings, it is to be understood that the scope is not limited to those precise embodiments, and that various other changes and modifications may be affected therein by one skilled in the art without departing from the scope or spirit as defined in the claims.

The accompanying figures and this description depicted and described embodiments, and features and components thereof. Those skilled in the art will appreciate that any particular program nomenclature used in this description was merely for convenience, and thus the embodiments should not be limited to use solely in any specific application identified and/or implied by such nomenclature. Therefore, it is desired that the embodiments described herein be considered in all respects as illustrative, not restrictive, and that reference be made to the appended claims for determining the scope.

What is claimed is:

1. A method of memory management comprising:
    interrogating, with a memory space controller, memory characteristic information comprised within an excess portion of a virtual address associated with a data store request to determine a memory type to which data is to be stored in a memory space comprising one or more memory types;
    subsequent to the memory space controller determining the memory type to which data is to be stored, mapping the virtual address with a physical address associated with the determined memory type;
    storing data associated with the data store request to the determined memory type;
    clearing the memory characteristic information used to determine the memory type to which data is to be stored from the excess portion; and
    storing post-write memory characteristic information to the excess portion.

2. The method of claim 1 further comprising:
    determining whether the data should be migrated to a different memory type.

3. The method of claim 2 wherein determining whether the data should be migrated to a different memory type further comprises:
    interrogating the post-write memory characteristic information to determine a suggested memory type.

4. The method of claim 3 wherein determining whether the data should be migrated to a different memory type further comprises:
    comparing the memory type where the data is currently stored with the suggested memory type.

5. The method of claim 2 wherein the post-write memory characteristic information comprises multiple post-write components that are used to categorize the memory space or to categorize the data in the memory space.

6. The method of claim 5 wherein the memory characteristic information post-write components are selected from the group consisting of:
    a historical component, a O/S direction component, an access frequency component, a data age component, a data priority component, a job priority component, a job importance component, a job category component, a requester identification component, a latency component, a power component, a write cost component, and a read cost component.

7. The method of claim 1 further comprising:
    determining the availability of the excess portion to accept additional post-write memory characteristic information.

8. The method of claim 7 further comprises:
    adding additional post-write memory characteristic information to the excess portion.

9. The method of claim 1 further comprising:
    maintaining the post-write memory characteristic information in a table that associates the virtual address to a physical address within the memory type where the data is stored.

10. The method of claim 9 wherein the table is located in the memory space controller.

11. The method of claim 1 wherein the memory space controller is an input/output controller to a memory space comprising one or more different memory types.

12. The method of claim 1 further comprising:
    determining if the virtual address includes an excess portion comprising the memory characteristic information.

13. The method of claim 1 further comprising:
    determining the availability of the excess portion to accept additional memory characteristic information.

14. The method of claim 13 further comprising:
    adding additional memory characteristic information to the excess portion.

15. The method of claim 1 wherein memory characteristic information comprises multiple components that are used to categorize the memory space or to categorize data stored in the memory space.

16. The method of claim 1 wherein the memory space controller further comprises a table that maps the virtual address with the physical address associated with the determined memory type.

17. The method of claim 1 wherein the memory characteristic information components are selected from the group consisting of:
a historical component, a O/S direction component, a data priority component, a job priority component, a job importance component, a job category component, a requester identification component, a latency component, a power component, a write cost component, and a read cost component.

18. A memory system comprising:
a memory space having one or more different memory types; and
a memory space controller configured to:
interrogate memory characteristic information comprised within an excess portion of a virtual address associated with a data store request to determine a memory type to which data is to be stored;
subsequent to determining the memory type to which data is to be stored, map the virtual address with a physical address associated with the determined memory type;
store data associated with the data store request to a determined memory type; and
clear the memory characteristic information used to determine the memory type to which data is to be stored from the excess portion; and
store post-write memory characteristic information to the excess portion.

19. The memory system of claim 18 wherein the memory space controller is further configured to store additional memory characteristic information within the excess portion of the virtual address.

20. The memory system of claim 19 wherein the memory space controller comprises:
a table that maps the virtual address with the physical address associated with the determined memory type.

* * * * *